US008326639B2

(12) United States Patent
Wuebbolt et al.

(10) Patent No.: US 8,326,639 B2
(45) Date of Patent: Dec. 4, 2012

(54) AUDIO DATA STRUCTURE FOR LOSSY AND LOSSLESS ENCODED EXTENSION DATA

(75) Inventors: Oliver Wuebbolt, Hannover (DE); Florian Keiler, Hannover (DE); Peter Jax, Hannover (DE); Sven Kordon, Hannover (DE); Johannes Boehm, Goettingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 991 days.

(21) Appl. No.: 12/309,370

(22) PCT Filed: Jul. 5, 2007

(86) PCT No.: PCT/EP2007/056824
§ 371 (c)(1),
(2), (4) Date: Jan. 15, 2009

(87) PCT Pub. No.: WO2008/009564
PCT Pub. Date: Jan. 24, 2008

(65) Prior Publication Data
US 2009/0240506 A1 Sep. 24, 2009

(30) Foreign Application Priority Data
Jul. 18, 2006 (EP) .................................... 06117375

(51) Int. Cl.
*G10L 19/02* (2006.01)
*H04B 1/66* (2006.01)

(52) U.S. Cl. ......................... 704/500; 704/501; 370/476

(58) Field of Classification Search .................. 704/500, 704/501; 370/476
See application file for complete search history.

(56) References Cited

U.S. PATENT DOCUMENTS 5,706,396 A 1/1998 Schroder et al.
(Continued)

FOREIGN PATENT DOCUMENTS

EP 0756386 7/1996
(Continued)

OTHER PUBLICATIONS

Audio Subgroup WG11: "ISO/IEC 14496-3:2001/AMD 5, Audio Scalable Lossless Coding (SLS)", ISO/IEC JTC1/SC 29/WG11 N6014, Oct. 2003, XP002405669.
Rongshan Yu et al. "Proposed Bitstream Revision for MPEG-4 SLS (Draft)", ISO/IEC JTC1/SC 29/WG11 M11632, Jan. 2005, XP002405670.

(Continued)

*Primary Examiner* — Martin Lerner
(74) *Attorney, Agent, or Firm* — Tutunjian & Bitetto, P.C.

(57) ABSTRACT

Lossless audio coding performs decorrelation and encodes the transformed signal. The encoded bit stream comprises de-correlation parameters and the lossless representation data of the transformed signal. However, in the case of lossy based lossless coding, the additional amount of information exceeds the base layer amount of data. Therefore the additional data cannot be packed completely into the base layer e.g. as ancillary data. The data streams resulting from the combination of lossy coding format with a lossless coding extension are the base layer containing the lossy coding information and the enhancement data stream for rebuilding the mathematically lossless original input signal. Every higher layer depends on the lower layers and can only be reasonably decoded in combination with these lower layers. According to the invention, a special combination of one-time header information with repeated header information in a block structure is used. Assignment information data identify the different layers.

11 Claims, 7 Drawing Sheets

U.S. PATENT DOCUMENTS

Figure 1:
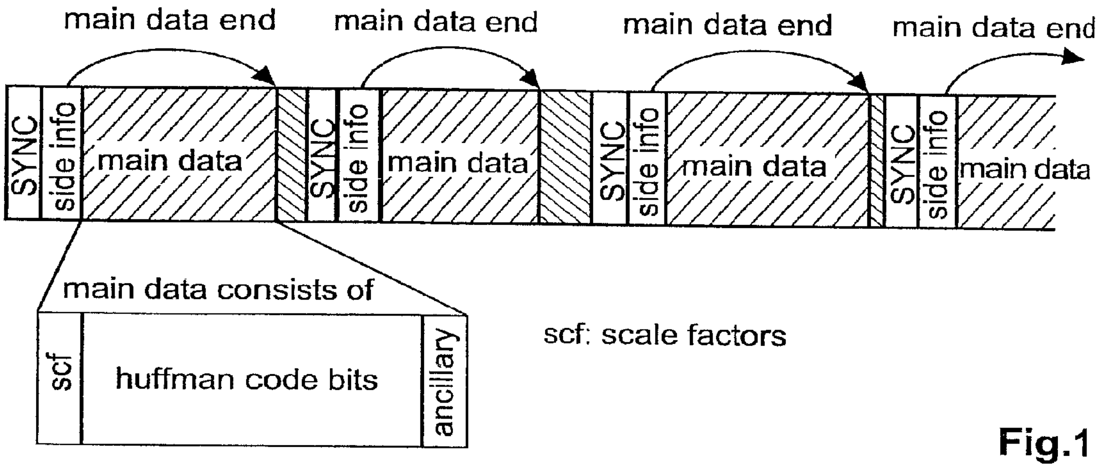
Fig.1 (Prior art)

| | | | | |
|---|---|---|---|---|
| 6,094,636 | A * | 7/2000 | Kim | 704/500 |
| 6,226,616 | B1 | 5/2001 | You et al. | |
| 6,498,811 | B1 * | 12/2002 | Van Der Vleuten | 375/240 |
| 6,526,384 | B1 * | 2/2003 | Mueller et al. | 704/501 |
| 7,536,305 | B2 * | 5/2009 | Chen et al. | 704/500 |
| 7,617,097 | B2 * | 11/2009 | Kim et al. | 704/219 |
| 7,937,272 | B2 * | 5/2011 | Oomen et al. | 704/500 |
| 2003/0171919 | A1 * | 9/2003 | Kim et al. | 704/229 |
| 2004/0078205 | A1 | 4/2004 | Liljeryd et al. | |
| 2005/0234731 | A1 * | 10/2005 | Sirivara et al. | 704/500 |
| 2005/0246178 | A1 * | 11/2005 | Fejzo | 704/500 |
| 2008/0021712 | A1 * | 1/2008 | Fejzo | 704/500 |
| 2009/0122992 | A1 * | 5/2009 | Kordon et al. | 380/287 |
| 2009/0164226 | A1 * | 6/2009 | Boehm et al. | 704/500 |
| 2009/0177478 | A1 * | 7/2009 | Jax et al. | 704/500 |
| 2009/0306993 | A1 * | 12/2009 | Wuebbolt et al. | 704/500 |
| 2011/0103445 | A1 * | 5/2011 | Jax et al. | 375/224 |
| 2011/0106546 | A1 * | 5/2011 | Fejzo | 704/501 |
| 2011/0158326 | A1 * | 6/2011 | Kordon et al. | 375/240.25 |
| 2011/0224991 | A1 * | 9/2011 | Fejzo | 704/500 |

FOREIGN PATENT DOCUMENTS

| | | |
|---|---|---|
| JP | 2001521648 | 11/2001 |
| JP | 2003502704 | 1/2003 |
| JP | 2006139054 | 6/2006 |

OTHER PUBLICATIONS

D-H Kim et al: "Scalable Lossless Audio Coding Based on MPEG-4 BSAC" Preprints of Papers Presented At the AES Convention. Oct. 5, 2002, pp. 1-4, XP009028921.

Audio Subgroup WG11: "ISO/IEC 14496-3:2001/AMD 4, Audio Lossless Coding (ALS)" ISO/IEC JTC1/SC 29/WG11 N6133, Dec. 2003, XP002405671.

"Information Technology—Coding of Moving Pictures and Associated Audio for Digital Storage Media At Up to About 1,5 Mbit/S—Part 3: Audio Technologies de l'Information-Codage de l'Image, Animee et Du Son Associe Pour Les Suports de Stockage Numeri" Int'l Standard No. 11172-3, Aug. 1, 1993, pp. 1-158, XP008050513.

Search Report Dated Sep. 4, 2007.

Makhoul, J., "Linear prediction: A Tutorial Review", Proceedings of the IEEE, vol. 63, No. 4, Apr. 1975, pp. 561-580.

Painter, T. et al., "Perceptual Coding of Digital Audio", Proceedings of the IEEE, vol. 88, No. 4, Apr. 2000, pp. 451-513.

Hans, M. et al., "Lossless Compression of Digital Audio", IEEE Signal Processing Magazine, Jul. 2001, pp. 21-32.

Craven, M. et al., "Lossless Coding for Audio Discs", J. Audio Eng. Soc., vol. 44, No. 9, Sep. 1996, pp. 706-720.

Koller, J. et al., "Robust Coding of High Quality Audio Signals", AES 103rd Convention, Preprint 4621, Aug. 1997, pp. 1-20.

* cited by examiner

AUDIO DATA STRUCTURE FOR LOSSY AND LOSSLESS ENCODED EXTENSION DATA

This application claims the benefit, under 35 U.S.C. §365 of International Application PCT/EP2007/056824, filed Jul. 5, 2007, which was published in accordance with PCT Article 21(2) on Jan. 24, 2008 in English and which claims the benefit of European patent application No. 06117375.3, filed Jul. 18, 2006.

The invention relates to a data structure arranging bitstream data for a lossy encoded signal together with lossless extension encoded data for said signal. Additionally, intermediate quality extension encoded data can be arranged in this data structure.

BACKGROUND

In contrast to lossy audio coding techniques (like mp3, AAC etc.), lossless compression algorithms can only exploit redundancies of the original audio signal to reduce the data rate. It is not possible to rely on irrelevancies, as identified by psycho-acoustical models in state-of-the-art lossy audio codecs. Accordingly, the common technical principle of all lossless audio coding schemes is to apply a filter or transform for de-correlation (e.g. a prediction filter or a frequency transform), and then to encode the transformed signal in a lossless manner. The encoded bit stream comprises the parameters of the transform or filter, and the lossless representation of the transformed signal. See, for example, J. Makhoul, "Linear prediction: A tutorial review", Proceedings of the IEEE, Vol. 63, pp. 561-580, 1975, T. Painter, A. Spanias, "Perceptual coding of digital audio", Proceedings of the IEEE, Vol. 88, No. 4, pp. 451-513, 2000, and M. Hans, R. W. Schafer, "Lossless compression of digital audio", IEEE Signal Processing Magazine, July 2001, pp. 21-32.

Figure 12:
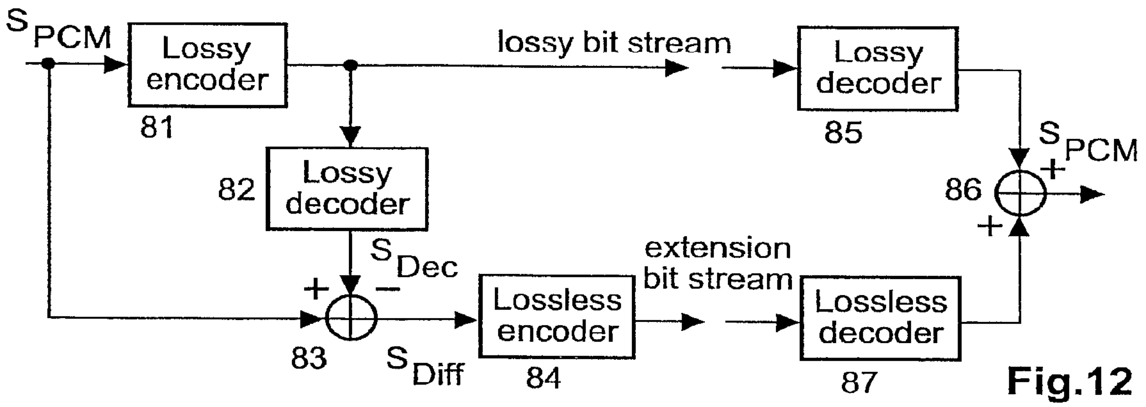
Fig.12 ( Prior art )
Figure 13:
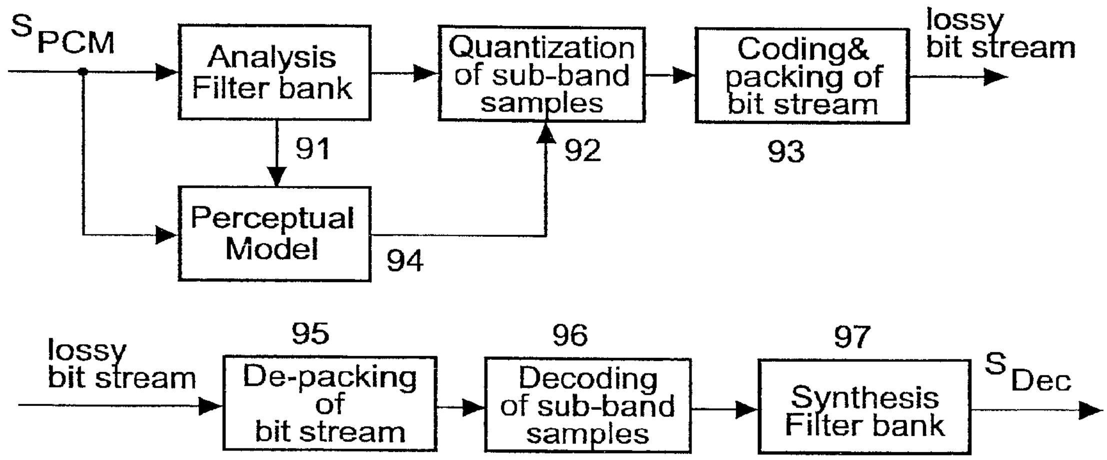
Fig.13 ( Prior art )

The basic principle of lossy based lossless coding is depicted in FIG. 12 and FIG. 13. In the encoding part on the left side of FIG. 12, a PCM audio input signal $S_{PCM}$ passes through a lossy encoder 81 to a lossy decoder 82 and as a lossy bit stream to a lossy decoder 85 of the decoding part (right side). Lossy encoding and decoding is used to de-correlate the signal. The output signal of decoder 82 is removed from the input signal $S_{PCM}$ in a subtractor 83, and the resulting difference signal passes through a lossless encoder 84 as an extension bit stream to a lossless decoder 87. The output signals of decoders 85 and 87 are combined 86 so as to regain the original signal $S_{PCM}$.

This basic principle is disclosed in EP-B-0756386 and U.S. Pat. No. 6,498,811, and is also discussed in P. Craven, M. Gerzon, "Lossless Coding for Audio Discs", J. Audio Eng. Soc., Vol. 44, No. 9, September 1996, and in J. Koller, Th. Sporer, K. H. Brandenburg, "Robust Coding of High Quality Audio Signals", AES 103rd Convention, Preprint 4621, August 1997. In the lossy encoder in FIG. 13, the PCM audio input signal $S_{PCM}$ passes through an analysis filter bank 91 and a quantisation 92 of sub-band samples to a coding and bit stream packing 93. The quantisation is controlled by a perceptual model calculator 94 that receives signal $S_{PCM}$ and corresponding information from the analysis filter bank 91.

At decoder side, the encoded lossy bit stream enters a means 95 for de-packing the bit stream, followed by means 96 for decoding the subband samples and by a synthesis filter bank 97 that outputs the decoded lossy PCM signal $S_{Dec}$.

Examples for lossy encoding and decoding are described in detail in the standard ISO/IEC 11172-3 (MPEG-1 Audio).

The two or more different signals or bit streams resulting from the encoding are to be combined so as to form a single output signal. Similar solutions exist for example for MPEG Surround, mp3PRO and AAC+. For the two latter examples the additional amount of data (SBR information) to be added to the base layer data stream (AAC or mp3) is small. Therefore this additional information can be packed into a standard-conform AAC or mp3 bit stream e.g. as 'ancillary data'. Although the additional amount of data for the surround information is bigger than that for the SBR information, these data can still be packed into a standard-conform bit stream in the same way.

Another application using similar techniques is the ID3 tag added to mp3 standard audio streams. The data is added at the beginning or end of the existing mp3 file. A special mechanism is used so that an mp3 decoder does not try to decode this additional information.

INVENTION

However, in case of lossy based lossless coding the additional amount of information exceeds the amount of data for the base layer by a multiple of the base layer data amount. Therefore the additional data cannot be packed completely into the base layer data stream e.g. as ancillary data. The at least two data streams resulting from the combination of lossy coding format with a lossless coding extension are the base layer containing the lossy coding information (e.g. a standard coding algorithm) and the enhancement data stream for rebuilding the mathematically lossless original input signal. Furthermore several intermediate layers are possible, each with an own data stream. However, these data streams are not independent. Every higher layer depends on the lower layers and can only be reasonably decoded in combination with these lower layers.

A problem to be solved by the invention is to provide additional information in the file format or streaming format to allow for synchronisation, identification and compatibility control of the different layers and the packing of real audio data.

According to the invention, a special combination of one-time header information with repeated header information in a block structure is used, which kind of combination depends on the type of application (streaming format or file format).

Assignment information data items identify the different parts/layers of the lossless format belonging to one input signal. A control mechanism indicates if a lower layer data stream is altered, which could result in incompatibility of the layers. Furthermore, synchronisation information data items are used to combine the different data streams/parts/layers to a single lossless or intermediate (if intermediate layers are used) output signal. These features are used in a streaming format as well as in a file format of the combined output data stream.

The file format, which can be used for archiving or storage applications, can consist of a single file combining the different data parts/layers, or several files. The packing into a single file must regard some constraints:

- the combination of a standard lossy coding/decoding processing with a lossless extension has to consider all restrictions of the underlying lossy coding standard in order to preserve backwards compatibility with the lossy coding/decoding standard;
- the base layer (i.e. the lossy encoded data) is to be easily extractable from the complete lossless data file, representing an independently decodable data file.

In principle, the inventive data structure is defined by: Data structure arranging bitstream data for a lossy encoded signal together with lossless extension encoded data for said signal, said data structure being defined by:

the lossy encoded data and the lossless extension encoded data are arranged in a single file, whereby said lossy encoded data are arranged in a first contiguous section of said file and said lossless extension encoded data are arranged in a second contiguous section of said file;

said first file section includes multiple data blocks each beginning with sync data and side info data followed by main data for said lossy encoded data;

said second file section comprises a single header section including:

a header ID for identifying the corresponding lossless encoded bit stream;

an indicator for the header length;

an optional fingerprint code;

side information data;

a cue point table defining entry points that allow starting decoding of said lossy encoded data together with said lossless extension encoded data, said second file section further comprises multiple data frames each including:

an optional sync word facilitating finding the beginning of successive frames of lossless extension encoded data;

an indicator for the frame length;

said lossless extension encoded data;

side information required for decoding said lossless extension encoded data together with said lossy encoded data, or Data structure arranging bitstream data for a lossy encoded signal together with lossless extension encoded data for said signal, said data structure being defined by:

the lossy encoded data are arranged in a first file and the lossless extension encoded data are arranged in a second file;

said first file includes multiple data blocks each beginning with sync data and side info data followed by main data for said lossy encoded data;

said second file comprises a single header section including:

a header ID for identifying the corresponding lossless encoded bit stream;

an indicator for the header length;

a fingerprint code;

side information data;

a cue point table defining entry points that allow starting decoding of said lossy encoded data together with said lossless extension encoded data, said second file further comprises multiple data frames each including:

an optional sync word facilitating finding the beginning of successive frames of lossless extension encoded data;

an indicator for the frame length;

said lossless extension encoded data;

side information required for decoding said lossless extension encoded data together with said lossy encoded data, or Data structure arranging bitstream data for a lossy encoded signal together with lossless extension encoded data for said signal, said data structure being defined by:

the lossy encoded data and the lossless extension encoded data are arranged in a single file, whereby said lossy encoded data are arranged in a first contiguous section of said file and said lossless extension encoded data are arranged in a second contiguous section of said file;

said first file section includes multiple data blocks each beginning with sync data and side info data followed by main data for said lossy encoded data;

said second file section comprises a single header section including:

a header ID for identifying the corresponding lossless encoded bit stream;

an indicator for the header length;

an optional fingerprint code;

side information data, said second file section further comprises multiple data frames each including:

an optional sync word facilitating finding the beginning of successive frames of lossless extension encoded data;

an indicator for the frame length;

said lossless extension encoded data;

side information required for decoding said lossless extension encoded data together with said lossy encoded data, whereby a cue point table defining entry points that allow starting decoding of said lossy encoded data together with said lossless extension encoded data is either attached to said header section in said second file section or is arranged between said second file header section and the first one of said multiple data frames, or Data structure arranging bitstream data for a lossy encoded signal together with lossless extension encoded data for said signal, said data structure being defined by:

the lossy encoded data are arranged in a first file and the lossless extension encoded data are arranged in a second file;

said first file includes multiple data blocks each beginning with sync data and side info data followed by main data for said lossy encoded data;

said second file comprises a single header section including:

a header ID for identifying the corresponding lossless encoded bit stream;

an indicator for the header length;

a fingerprint code;

side information data, said second file further comprises multiple data frames each including:

an optional sync word facilitating finding the beginning of successive frames of lossless extension encoded data;

an indicator for the frame length;

said lossless extension encoded data;

side information required for decoding said lossless extension encoded data together with said lossy encoded data, whereby a cue point table defining entry points that allow starting decoding of said lossy encoded data together with said lossless extension encoded data is either attached to said second file header section or is arranged between said second file header section and the first one of said multiple data frames, or Data structure arranging bitstream data for a lossy encoded signal together with lossless extension encoded data and intermediate quality extension encoded data for said signal, said data structure being defined by:

the lossy encoded data are arranged in a first file, the intermediate quality extension encoded data are arranged in a second file and the lossless extension encoded data are arranged in a third file;

said first file includes multiple data blocks each beginning with sync data and side info data followed by main data for said lossy encoded data;

said second file comprises a single header section including:

a header ID for identifying the corresponding intermediate quality extension encoded bit stream;

an indicator for this header length;

a fingerprint code;

side information data;

a cue point table defining entry points that allow starting decoding of said lossy encoded data together with said intermediate quality extension encoded data, said second file further comprises multiple data frames each including:

an optional sync word facilitating finding the beginning of successive frames of intermediate quality extension encoded data;

an indicator for this frame length;

said intermediate quality extension encoded data;

side information required for decoding said intermediate quality extension encoded data together with said lossy encoded data;

said third file comprises a single header section including:

a header ID for identifying the corresponding lossless extension encoded bit stream;

an indicator for this header length;

a fingerprint code;

side information data;

a cue point table defining entry points that allow starting decoding of said lossy encoded data together with said lossless extension encoded data, said third file further comprises multiple data frames each including:

an optional sync word facilitating finding the beginning of successive frames of lossless extension encoded data;

an indicator for this frame length;

said lossless extension encoded data;

side information required for decoding said lossless extension encoded data together with said lossy encoded data, or Data structure for a bitstream arranging data for a lossy encoded signal together with lossless extension encoded data and optional intermediate quality extension encoded data for said signal, said data structure being using successive data group sections, each data group section including:

a first section comprising a lossless extension header including:

a header ID for identifying the corresponding lossless or intermediate quality encoded bit stream;

an indicator for the header length;

an optional fingerprint code;

side information data;

an indicator for the frame length of a lossless extension encoded data frame;

an optional indicator for the data length of an intermediate quality extension encoded data section, an optional indicator for the data length of a lossy encoded data section, a second section comprising N lossy encoded data frames, said second section including N data blocks each beginning with sync data and side info data followed by main data for a lossy encoded data frame;

a third section comprising N lossless extension encoded data frames, said third section including:

said lossless extension encoded data and related side information required for decoding said lossless extension encoded data together with said lossy encoded data, optionally, said intermediate quality extension encoded data and related side information required for decoding said intermediate quality extension encoded data together with said lossy encoded data.

Advantageous additional embodiments of the invention are disclosed in the respective dependent claims.

DRAWINGS

Figure 2:
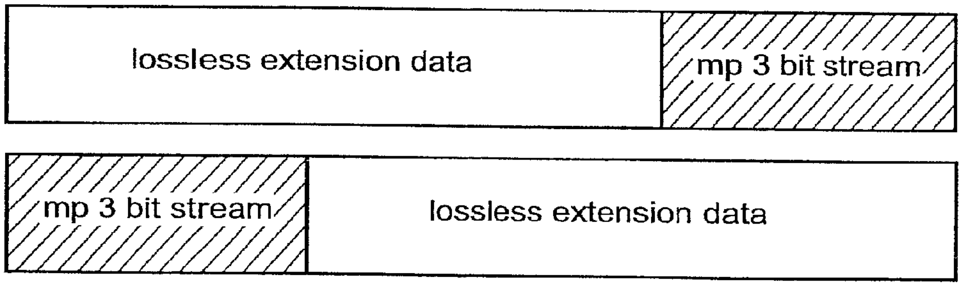
Figure 3:
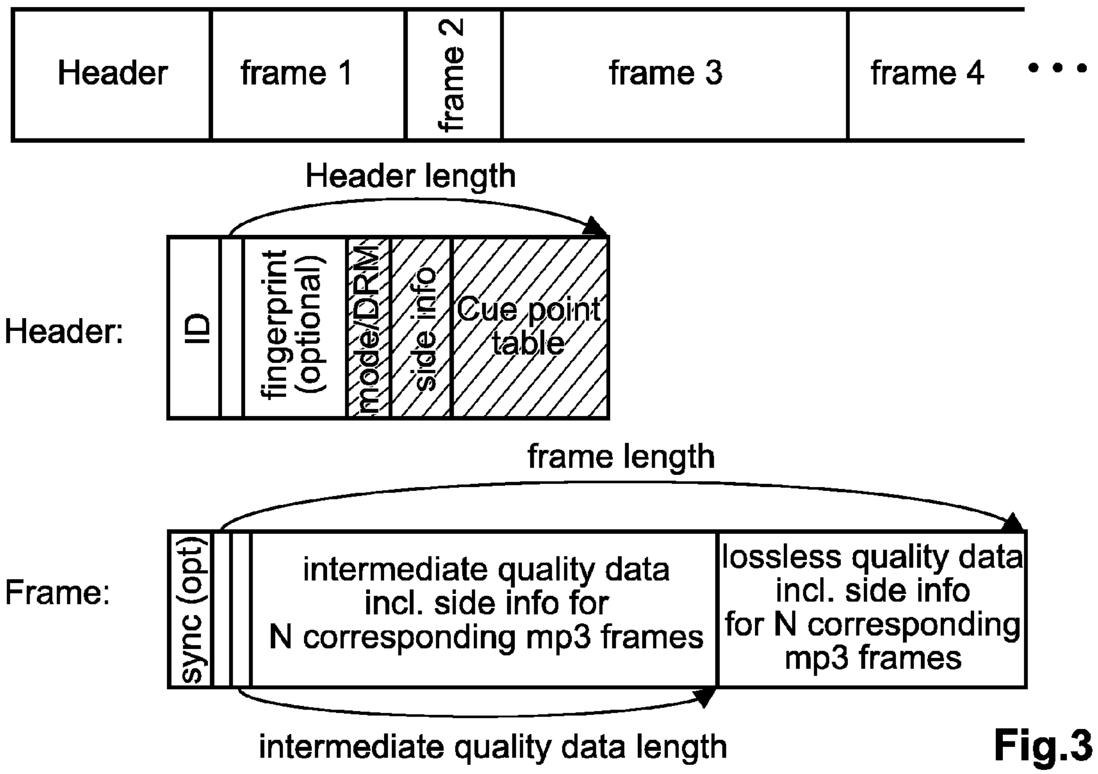
Figure 4:
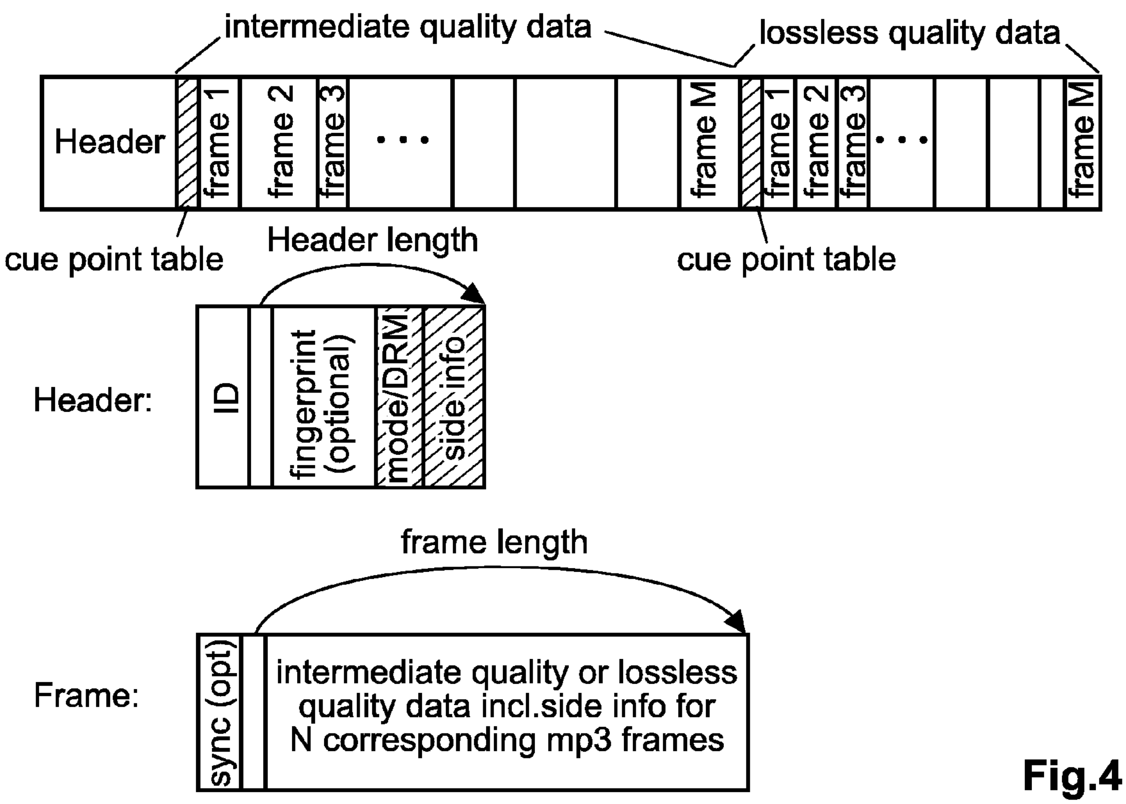
Figure 5:
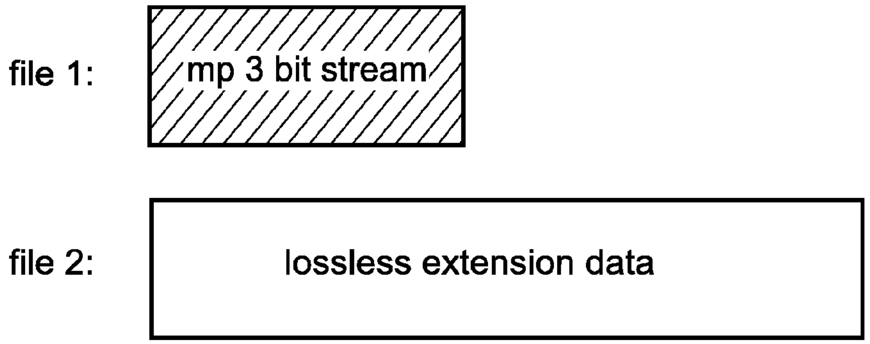
Figure 6:
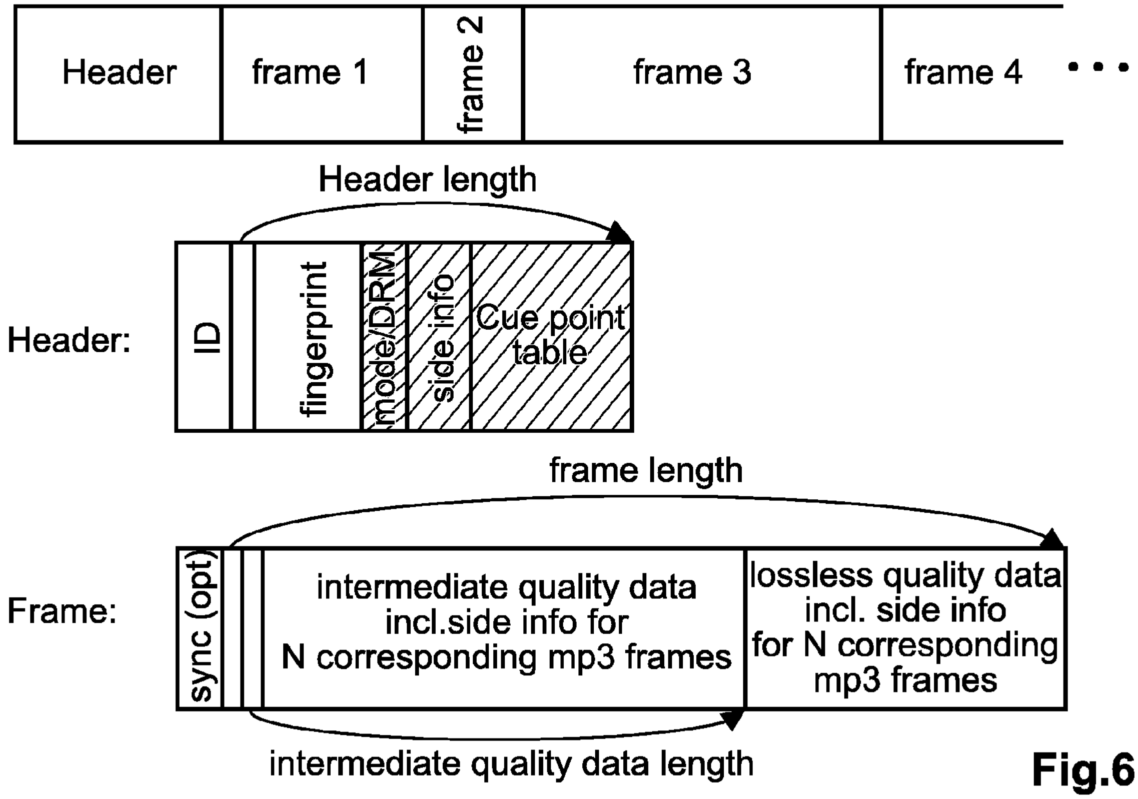
Figure 7:
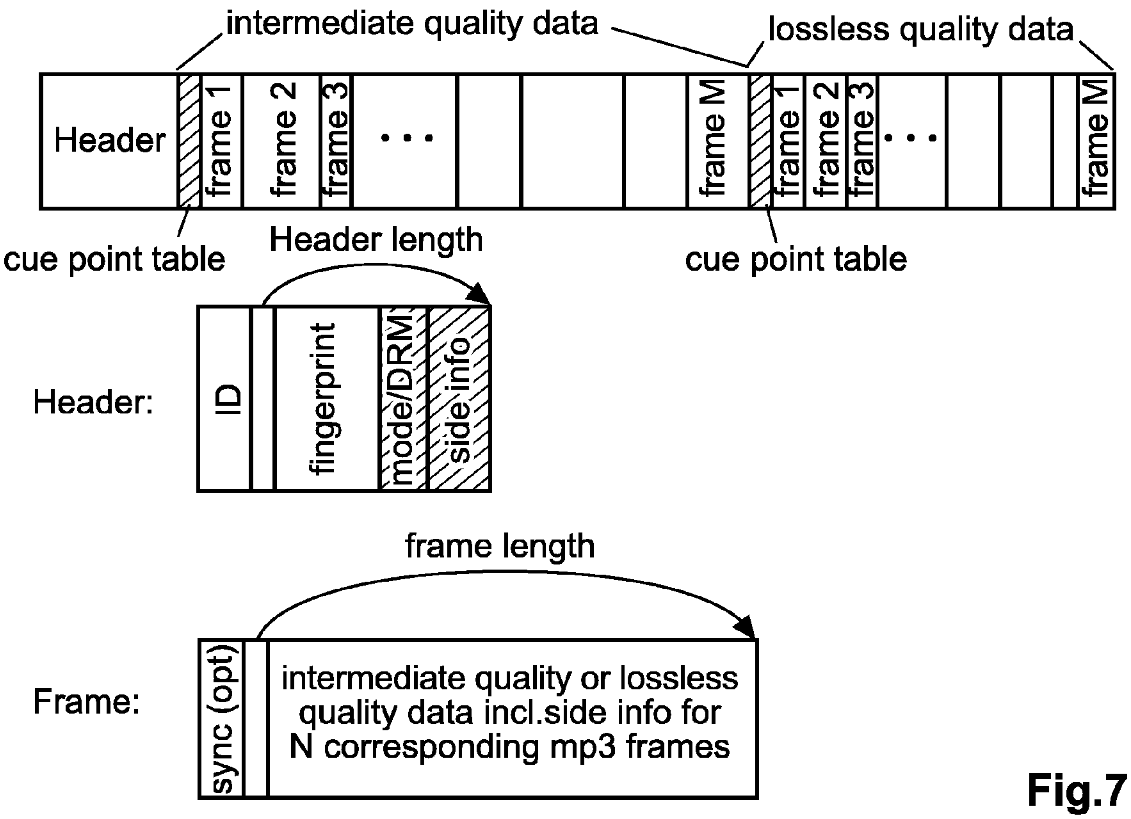
Figure 8:
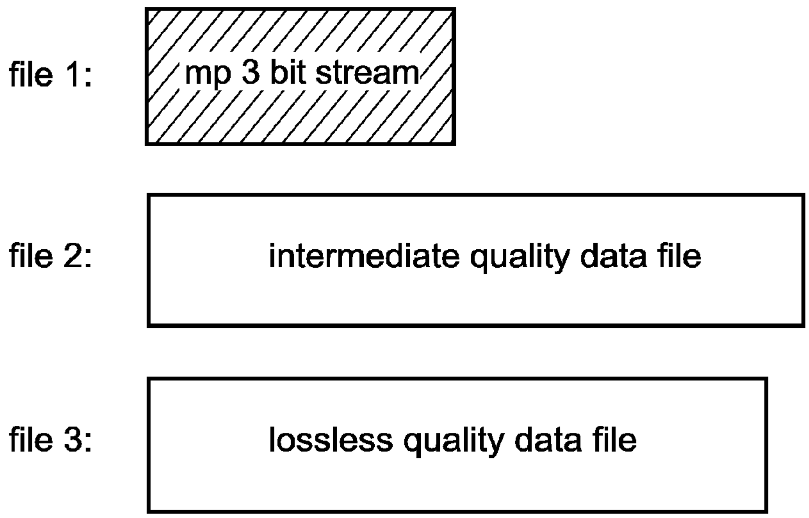
Figure 9:
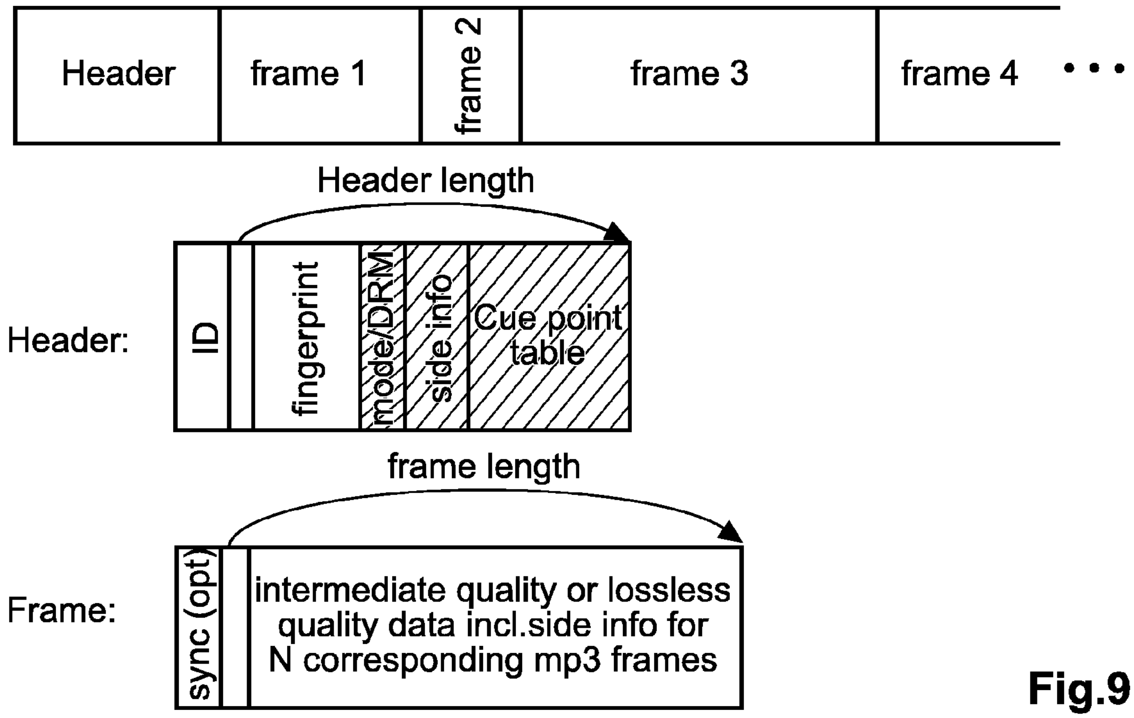
Figure 10:
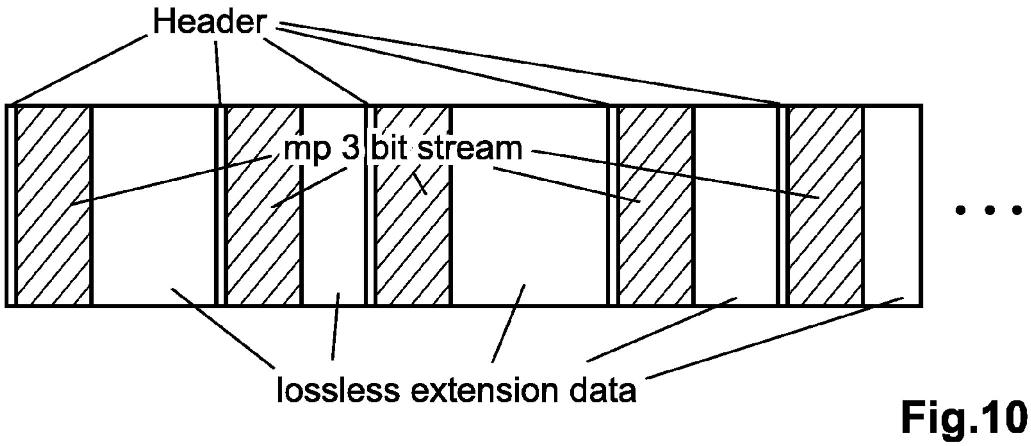
Figure 11:
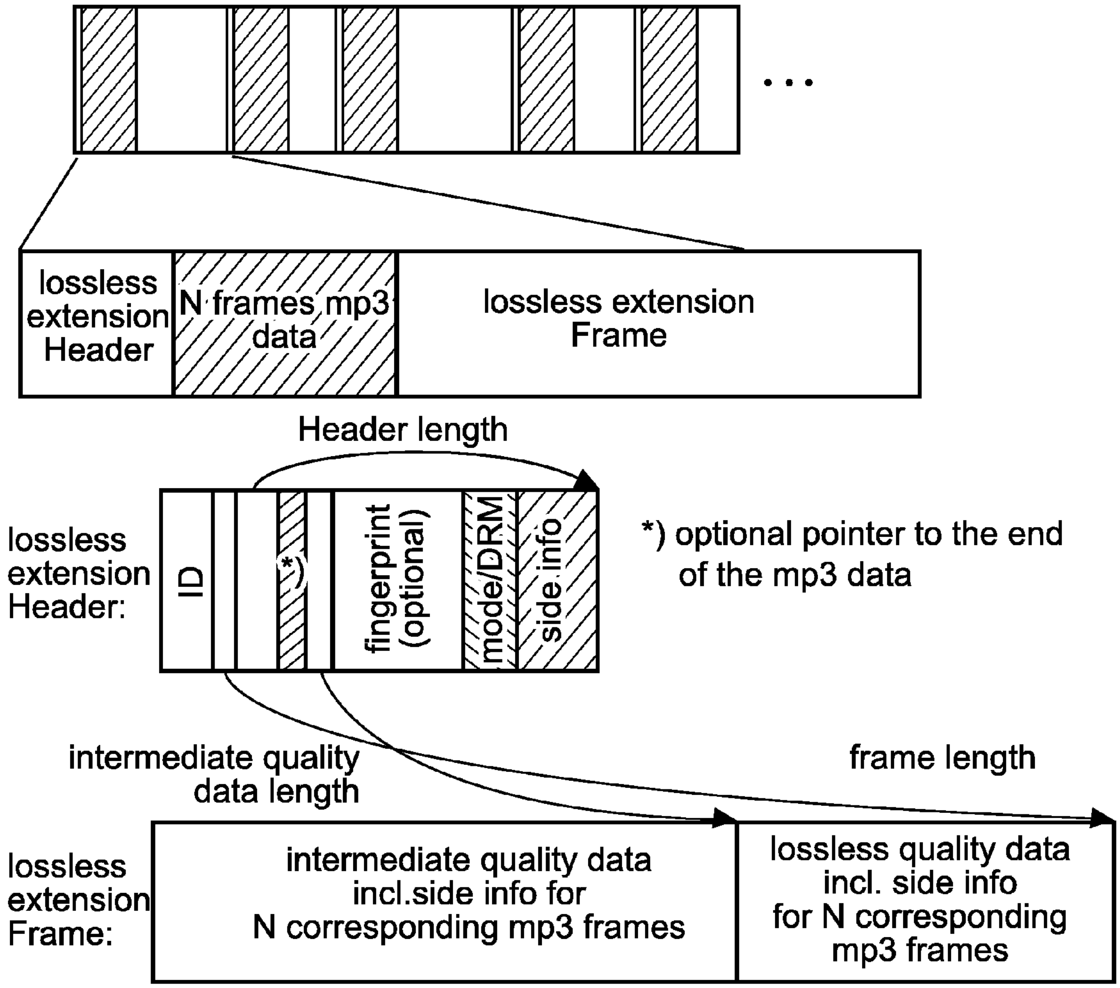

Exemplary embodiments of the invention are described with reference to the accompanying drawings, which show in:

FIG. 1 known mp3 bit stream structure;

FIG. 2 two possibilities for the basic structure of the container format;

FIG. 3 detailed structure of the lossless extension data part for the container file format;

FIG. 4 detailed alternative structure of the lossless extension data part for the container file format;

FIG. 5 basic structure of the mp3 lossless file format using two separated files;

FIG. 6 detailed structure of the lossless extension data file, i.e. the second file in FIG. 5;

FIG. 7 detailed alternative structure of the lossless extension data file, i.e. the second file in FIG. 5;

FIG. 8 basic structure of the mp3 lossless file format using three separate files;

FIG. 9 detailed structure of the extension data files (intermediate quality data and lossless quality data);

FIG. 10 basic structure of the mp3 lossless streaming format;

FIG. 11 detailed structure of the mp3 lossless streaming format;

FIG. 12 basic block diagram for a known lossy based lossless encoder and decoder;

FIG. 13 basic block diagram for a known lossy encoder and decoder.

EXEMPLARY EMBODIMENTS

The following description deals with the specific application for mp3 lossless data format, and a skilled person can adapt it correspondingly to other lossless data formats. As mentioned above, mp3 lossless is a combination of an mp3 coded audio file with additional information that allows a mathematically exact reproduction of the original input signal of the coded audio file. Furthermore the invention allows to generate data formats for intermediate sound quality levels between the mp3 coded audio file and the lossless encoded quality levels.

The basic condition to be regarded is the file format of the base layer, i.e. the mp3 file format or bit stream depicted in FIG. 1. The encoded data is arranged in a frame structure. Each frame contains a sync word so that the decoding process of the mp3 file can be started at every frame each time such sync word is identified. The sync word is followed by mp3-specific side information data having a fixed length. Thereafter follows a variable-length main data section that includes mp3-specific scale factors, the spectral data (Huffman coded data or coefficients) and some optional ancillary data. A more detailed description can be found in ISO/IEC 11172-3. Each one of these frames corresponds to a segment or section of the audio signal, whereby its length depends on the sampling frequency of the audio signal and on the target bit rate of the mp3 file.

Each block of the lossless extension data is related to a corresponding frame of the mp3 data. Therefore the inventive file/streaming format provides an unambiguous assignment of the corresponding data. Three basic embodiments are presented:

storing the mp3 data and extension data in a single-container file format;

storing the mp3 data and extension data in different files;

streaming format.

Storing the mp3 Data and Lossless Extension Data in a Single-Container File Format Two alternative basic bit stream structures are depicted in FIG. 2. To allow an easy extraction of an mp3 compatible stand-alone file and to also allow the decoding of the mp3 data by an mp3 decoder from the complete container file, the additional information is placed at the end or at the beginning of an mp3-conform bit stream.

The mp3 bit stream might also contain additional information like e.g. ID3 tags. But it is to be assured that the additional data does not contain mp3 sync words to prevent an mp3 decoder not being capable of decoding mp3 lossless to try to interpret the additional data as an mp3 bit stream.

This data structure allows an easy stripping of the mp3 bit stream from the container format, i.e. the combined format. The lossless extension part contains information items (e.g. cue points table or tables, sync words, frame length or data length information) which facilitate the combined decoding of the mp3 data and the lossless extension bit stream. The decoding may result in an mp3-quality audio signal, a (scalable) intermediate-quality audio signal or the mathematically-lossless audio signal.

A detailed structure of the first lossless extension data is shown in FIG. 3, and a different structure is shown in FIG. 4. The corresponding mp3 bit stream part is illustrated in FIG. 1.

In the first bit stream structure the data for the intermediate quality and the data for the lossless quality are interlaced in the bit stream and one block of each builds a frame. These frames have a variable length and therefore include a frame length indicator. The data in these blocks corresponds to N mp3 frames. The number of N can be chosen by the encoder and is transmitted as side information in the mp3 lossless extension header.

A frame includes the following data:

an optional sync word facilitating finding the beginning of successive frames of data;

an indicator for the frame length;

an optional indicator for the length of the intermediate quality data;

side information required for decoding the intermediate-quality signal data, and these encoded data;

side information required for decoding the mathematically-lossless audio file data based on the intermediate-quality audio file data, and these encoded data.

The header arranged at the beginning of the extension data part includes the following data:

a header ID for identifying an mp3 lossless bit stream;

an indicator for the header length;

an optional fingerprint code (e.g. CRC32 or any other checksum) allowing to detect a change of the mp3 base layer data. A change in the mp3 base layer data would result in incompatibility to the other layers and an incorrect decoding of the intermediate and lossless data. An incompatible fingerprint will result in a stop of the decoding. In a single-file container format the fingerprint data items are not necessary because an unintended change of the mp3 data without adapting the extension data is very unlikely;

a mode indication information block, DRM (digital rights management) information, and an unsynchronisation bit in case ID3 tag data and/or lossless extension data are present, i.e. the unsynchronisation mechanism defined for ID3 tag data can also be used for the lossless extension data. This serves for avoiding mp3 sync words in the lossless extension data. The unsynchronisation bit then signals whether or not the lossless extension data have been modified. The following modes can be indicated:

Mode-1

The decoder can decode any compliant lossy bit stream without a lossless extension stream. This mode is also active when an extension stream is present and no permissions are provided to use another mode (the decoder will check the extension stream and look for a matching permission ID in its rights data base);

Mode-2

The intermediate quality mode is also enabled by a permission check in the decoder examining extension stream data. Only the whitening data is de-packed and used by the lossy decoder;

Mode-3

The lossless mode is started after positive permission check;

side information data like codec delay, original file length, PCM word size, sample rate, block size of the extension data (N);

a cue point table data block containing one or more of e.g. block length, interval info in frames, number of table entries, pointer table. The cue points define entry points that allow starting decoding.

The second lossless extension data structure in a container file format uses two data blocks. One block is containing the intermediate-quality data and the other one the lossless-quality data. The difference to the first solution is, that now two cue point tables are necessary which preferably are not arranged as header data but are arranged at the beginning of each data block. One table contains the cue points for the intermediate-quality data and the other one for the lossless-quality data. It is advantageous to use the same frames as cue points for both kinds of extension data. In an alternative embodiment, these both cue point tables can be assigned to the header instead.

The rest of the information that is stored in the header remains unchanged.

Storing the mp3 Data and Extension Data in Different Files

The basic information to be stored in this file format is the same as in the preceding container file format. The main difference is that the fingerprint data, that is optional for the container format, is now important because the mp3 bit stream is stored in a separate file, which is a standard-conform mp3 file. This file can be edited by a conventional mp3 tool or software, which is not aware of the presence of the lossless extension data. However, a change in the basis mp3 file would result in incompatibilities between the extension data and the basis mp3 file, and it would not be possible anymore to decode the mathematically lossless audio file. To have a control mechanism, that ensures an unchanged mp3 basis file, the fingerprint is necessary. This can be the CRC32 checksum for example. If the fingerprint calculated from the mp3 file is not the same as the stored fingerprint in the lossless extension, the decoding can be stopped. The basic structure of the mp3 lossless data in two files is shown in FIG. 5, in which file 1 is a standard mp3 file that may also contain ID3 tags.

A first structure of the lossless extension data is illustrated in FIG. 6 and an alternative structure is depicted in FIG. 7. Both structures are similar or—except the mandatory presence of the fingerprint data—identical to the respective structures in the single-container file format.

A further possibility to store the lossless extension data is storing these data in two separate files plus the basis mp3 file, resulting in three separated files as depicted in FIG. 8. The intermediate quality data and the lossless quality data are each stored in a separate file. In this format two fingerprints are necessary, one in the intermediate quality data file and the other one in the lossless quality data file. The fingerprint in the intermediate quality file is for example a CRC32 checksum of the basis mp3 file. In the lossless quality data file a fingerprint of the intermediate quality file can be used. This has the advantage, that in the lossless quality data file a second fingerprint of the basis mp3 file is obsolete. The mp3 fingerprint is already covered by the fingerprint in the intermediate quality file, which is therefore included in the fingerprint in the lossless quality data file.

The structure of both extension files is identical and is illustrated in FIG. 9. This structure is—except the specific fingerprint data items—identical to the structure depicted in FIG. 3 and FIG. 6.

Streaming Format

For a streaming application the data is organised differently than for the file applications. The mp3 bit stream data and the lossless extension data is arranged in an interlaced manner. This means that a block of the lossless extension data follows a corresponding block of mp3 data, whereby a lossless extension header is arranged prior to each block of mp3 data. This structure is illustrated in FIG. 10.

Such interlaced structure is necessary, because in a streaming application it is not possible to first transmit the base layer (mp3 data) and to afterwards transmit the extension data, because the delay between both would become too large. In such a scheme it is beneficial that the basis mp3 data is transmitted first and is followed by the extension data, because this scheme facilitates a graceful degradation of quality if the available bandwidth of the channel becomes to small to transmit all data. This is also the reason for the specific structure of the extension data, where the intermediate quality data is transmitted first followed by the lossless quality data. Thereby it is possible to skip the lossless data in case the bandwidth of the channel is reduced.

The detailed structure of the mp3 lossless stream is illustrated in FIG. 11. The stream is organised as follows:

First a header is transmitted, which basically contains the same information already mentioned for the file formats. In the header a fingerprint might be transmitted, however, because this is normally not necessary it can be skipped. Additionally, pointers to the end of the header, to the end of the intermediate quality data and to the end of the complete block or frame are included. A pointer to the end of the mp3 data can also be included but is only necessary if the mp3 data is encoded with variable bit rate (VBR). If the mp3 data is encoded with constant bit rate the end of the mp3 data block can be easily calculated and therefore this pointer is not necessary.

The header is followed by an mp3 encoded data block, i.e. by an mp3 data sync word. The mp3 data block includes N mp3 frames which are coded with variable bit rate (VBR) or constant bit rate (CBR), N being an integer greater equal '1'. The number N depends on the bandwidth of the channel and on the tolerable delay between the mp3 data and the lossless extension data. This number N is also coded in the side info section in the lossless extension header.

After a block of N mp3 data frames follows a block of the lossless extension data. In such lossless extension data block the intermediate quality data are arranged in the first section and the lossless quality data in the second section, each section containing the additional data for the N corresponding mp3 frames. In the streaming format no cue point tables are required because the data blocks already represent cue points.

The invention claimed is:

1. A non-transitory storage medium that stores a data structure arrangement of an audio signal for a lossy encoded audio signal together with lossless extension encoded data for said audio signal, said data structure comprising:

- the lossy encoded data and the lossless extension encoded data are arranged in a single file, whereby said lossy encoded data are arranged in a first contiguous section of said file and said lossless extension encoded data are arranged in a second contiguous section of said file;
- said first file section includes multiple data blocks each beginning with sync data and side info data followed by main data for said lossy encoded data;
- said second file section comprises a single header section including:
  - a header ID for identifying the corresponding lossless encoded bit stream;
  - an indicator for the header length;
  - side information data;
  - a cue point table defining entry points that allow starting decoding of said lossy encoded data together with said lossless extension encoded data,
- said second file section further comprises multiple data frames each including:
  - said lossless extension encoded data;
  - side information required for decoding said lossless extension encoded data together with said lossy encoded data.

2. The non-transitory storage medium according to claim 1, wherein said multiple data frames in said second file section each additionally include:

- intermediate-quality extension encoded data;
- an indicator for the length said intermediate-quality extension encoded data;
- side information required for decoding said intermediate-quality extension encoded data together with said lossy encoded data.

3. The non-transitory storage medium according to claim 1, wherein said header further includes one or more of mode indication information, DRM information, unsynchronization bit.

4. A non-transitory storage medium that stores a data structure arrangement of an audio signal for a lossy encoded audio signal together with lossless extension encoded data for said audio signal, said data structure comprising:

- the lossy encoded data are arranged in a first file and the lossless extension encoded data are arranged in a second file;
- said first file includes multiple data blocks each beginning with sync data and side info data followed by main data for said lossy encoded data;
- said second file comprises a single header section including:
  - a header ID for identifying the corresponding lossless encoded bit stream;
  - an indicator for the header length;
  - a fingerprint code;
  - side information data;
  - a cue point table defining entry points that allow starting decoding of said lossy encoded data together with said lossless extension encoded data,
- said second file further comprises multiple data frames each including:
  - said lossless extension encoded data;
  - side information required for decoding said lossless extension encoded data together with said lossy encoded data.

5. The non-transitory storage medium according to claim 4, wherein said multiple data frames in said second file each additionally include:

intermediate-quality extension encoded data;

an indicator for the length said intermediate-quality extension encoded data;

side information required for decoding said intermediate-quality extension encoded data together with said lossy encoded data.

6. A non-transitory storage medium that stores a data structure arrangement of an audio signal for a lossy encoded audio signal together with lossless extension encoded data for said audio signal, said data structure comprising:

the lossy encoded data and the lossless extension encoded data are arranged in a single file, whereby said lossy encoded data are arranged in a first contiguous section of said file and said lossless extension encoded data are arranged in a second contiguous section of said file;

said first file section includes multiple data blocks each beginning with sync data and side info data followed by main data for said lossy encoded data;

said second file section comprises a single header section including:

a header ID for identifying the corresponding lossless encoded bit stream;

an indicator for the header length;

side information data, said second file section further comprises multiple data frames each including:

said lossless extension encoded data;

side information required for decoding said lossless extension encoded data together with said lossy encoded data, whereby a cue point table defining entry points that allow starting decoding of said lossy encoded data together with said lossless extension encoded data is either attached to said header section in said second file section or is arranged between said second file header section and the first one of said multiple data frames.

7. The non-transitory storage medium according to claim 6, wherein other multiple data frames are arranged between said header section of said second file section and said multiple data frames, said other multiple data frames including:

an indicator for the length of said intermediate quality extension encoded data;

said intermediate quality extension encoded data;

side information required for decoding said intermediate-quality extension encoded data together with said lossy encoded data, whereby a further cue point table defining entry points that allow starting decoding of said lossy encoded data together with said intermediate quality extension encoded data is either attached to this header section or is arranged between this header section and the first one of said other multiple data frames.

8. A non-transitory storage medium that stores a data structure arrangement of an audio signal for a lossy encoded audio signal together with lossless extension encoded data for said audio signal, said data structure comprising:

the lossy encoded data are arranged in a first file and the lossless extension encoded data are arranged in a second file;

said first file includes multiple data blocks each beginning with sync data and side info data followed by main data for said lossy encoded data;

said second file comprises a single header section including:

a header ID for identifying the corresponding lossless encoded bit stream; an indicator for the header length;

a fingerprint code;

side information data, said second file further comprises multiple data frames each including:

said lossless extension encoded data;

side information required for decoding said lossless extension encoded data together with said lossy encoded data, whereby a cue point table defining entry points that allow starting decoding of said lossy encoded data together with said lossless extension encoded data is either attached to said second file header section or is arranged between said second file header section and the first one of said multiple data frames.

9. The non-transitory storage medium according to claim 8, wherein other multiple data frames are arranged between said header section in said second file and said multiple data frames, said other multiple data frames including:

an indicator for the length of said intermediate quality extension encoded data;

said intermediate quality extension encoded data;

side information required for decoding said intermediate-quality extension encoded data together with said lossy encoded data, whereby a further cue point table defining entry points that allow starting decoding of said lossy encoded data together with said intermediate quality extension encoded data is either attached to this header section or is arranged between this header section and the first one of said other multiple data frames.

10. A non-transitory storage medium that stores a data structure arrangement of an audio signal for a lossy encoded audio signal together with lossless extension encoded data and intermediate quality extension encoded data for said audio signal, said data structure comprising:

the lossy encoded data are arranged in a first file, the intermediate quality extension encoded data are arranged in a second file and the lossless extension encoded data are arranged in a third file;

said first file includes multiple data blocks each beginning with sync data and side info data followed by main data for said lossy encoded data;

said second file comprises a single header section including:

a header ID for identifying the corresponding intermediate quality extension encoded bit stream;

an indicator for this header length;

a fingerprint code;

side information data;

a cue point table defining entry points that allow starting decoding of said lossy encoded data together with said intermediate quality extension encoded data, said second file further comprises multiple data frames each including:

said intermediate quality extension encoded data;

side information required for decoding said intermediate quality extension encoded data together with said lossy encoded data;

said third file comprises a single header section including:

a header ID for identifying the corresponding lossless extension encoded bit stream;

an indicator for this header length;

a fingerprint code; side information data;

a cue point table defining entry points that allow starting decoding of said lossy encoded data together with said lossless extension encoded data, said third file further comprises multiple data frames each including:

said lossless extension encoded data;

side information required for decoding said lossless extension encoded data together with said lossy encoded data.

11. A non-transitory storage medium that stores a data structure arrangement of an audio signal for a lossy encoded audio signal together with lossless extension encoded data and intermediate quality extension encoded data for said audio signal, said data structure comprising successive data group sections, each data group section including:

a first section comprising a lossless extension header including:

a header ID for identifying the corresponding lossless or intermediate quality encoded bit stream;

an indicator for the header length;

side information data;

an indicator for the frame length of a lossless extension encoded data frame;

a second section comprising N lossy encoded data frames, said second section including N data blocks each beginning with sync data and side info data followed by main data for a lossy encoded data frame;

a third section comprising N lossless extension encoded data frames, said third section including:

said lossless extension encoded data and related side information required for decoding said lossless extension encoded data together with said lossy encoded data, said intermediate quality extension encoded data and related side information required for decoding said intermediate quality extension encoded data together with said lossy encoded data.

* * * * *